United States Patent [19]

Katayama et al.

[11] Patent Number: 4,585,335

[45] Date of Patent: Apr. 29, 1986

[54] AUTOMATIC PROCESS CAMERA

[75] Inventors: Masanori Katayama; Miyauchi Yoshio; Okada Akira, all of Hikone, Japan

[73] Assignee: Dainippon Screen Mfg. Co., Ltd., Kyoto, Japan

[21] Appl. No.: 150,578

[22] Filed: May 16, 1980

[30] Foreign Application Priority Data

May 29, 1979 [JP] Japan .................. 54-66997

[51] Int. Cl.⁴ ............................................. G03B 29/00
[52] U.S. Cl. ........................................ 355/29; 355/76; 271/94
[58] Field of Search ................ 355/28, 29, 76; 271/94

[56] References Cited

U.S. PATENT DOCUMENTS

| | | | |
|---|---|---|---|
| 1,853,781 | 4/1932 | Rider | 271/94 |
| 1,895,654 | 1/1933 | Forrest | 355/29 |
| 3,025,052 | 3/1962 | Gutteling | 271/94 |
| 3,580,674 | 5/1971 | Schunk et al. | 355/29 |
| 3,689,150 | 9/1972 | Nothmann et al. | 355/76 |
| 4,135,810 | 1/1979 | Walter | 355/29 |
| 4,178,097 | 12/1979 | Sara | 355/132 |

FOREIGN PATENT DOCUMENTS 1390104  4/1975  United Kingdom ............... 355/28

OTHER PUBLICATIONS

IBM Technical Disclosure Bulletin, vol. 13, No. 9, Feb. 1971.

Primary Examiner—Monroe H. Hayes
Attorney, Agent, or Firm—Brumbaugh, Graves, Donohue & Raymond

[57] ABSTRACT

A process camera with an automatic copy-feeder to set a copy at the specific position of a vacuum copy holder, an automatic copy feeder to load or remove the copy, an automatic exposure having mechanism to set exposing conditions, an automatic film processor. The copy feeder is automatically controlled to load and remove copies one by one relating to the condition of the copy holder at the removing position, at the loading position or at the exposing position. On the other hand, the film feeder and the exposure are automatically controlled to perforate, expose and convey a roll film. Further, the exposed film is cut and conveyed into the film processor. Each of these operations are respectively controlled to be synthetically consistent to each other.

4 Claims, 7 Drawing Figures

AUTOMATIC PROCESS CAMERA

BACKGROUND OF THE INVENTION

The invention which broadly relates to an automatic process camera, particularly relates to a process camera being capable of automatic operations for many hours.

A process camera is one of the most important machines among various machines for photo-reproduction. It is utilized for producing an intermediate photography to print out a specific copy onto a printing material.

A process camera has been automated only in its specific parts, i.e., in operation of loading a film together with a contact screen onto a film holder, in exposure control or in film process etc., for example, as in the automatic copy-loading operation. The following has been provided: a rotary belt on which copies are arranged in order, and are intermittenly convey to be at the optical axis by driving the belt. However, such a method means that the operator must prepare many copies previous to exposure and thus this is an unconvenient method.

BRIEF SUMMARY OF THE INVENTION

Accordingly, it is an object of the present invention to provide an automatic process camera operating automatically all of the procedures.

Another object of the present invention is to provide an automatic process camera having an automatic copy feed which is readily adaptable for use.

Yet another object of the present invention is to provide an automatic process camera in which a sequential control circuit is set up to automatically operate procedures in order, without any loss of time or any mis-operation.

With these and other objects in view, the invention consists in the construction hereinafter fully described, illustrated in the accompanying drawings, and set forth in the claims hereto appended, it being understood that various changes in the operation, form, proportion and minor details of construction, within the scope of the claims, may be restored to without departing from the spirit of the inventors or sacrificing any of the advantages thereof.

These objects are fulfilled according to the invention by providing an automatic process camera which comprises a copy feeder to automatically and successively feed copies onto a copy holder, a film feeder to automatically and successively feed a rollfilm onto a film holder, rear case for automatically controlling the quantity exposure and an automatic film processor connected with the rear case by means of a suitable film conveyer as occasion demands. The process camera also includes sequential controlling means to operate the above mentioned apparatus or devices, whereby a series of operations can be automatically and successively completed; the copy feed onto the copy holder, the film feed onto the film holder, the exposure in the specific quantity exposure and the film process.

BRIEF DESCRIPTION OF THE DRAWINGS

The novel features which are considered characteristic of the invention are set forth in detail in the appended claims. The individual itself, however, and additional objects and advantages thereof will best be understood from the following description of an embodiment thereof when read in connection with the accompanying drawings, in which:

DETAILED DESCRIPTION OF THE INVENTION

Figure 1:
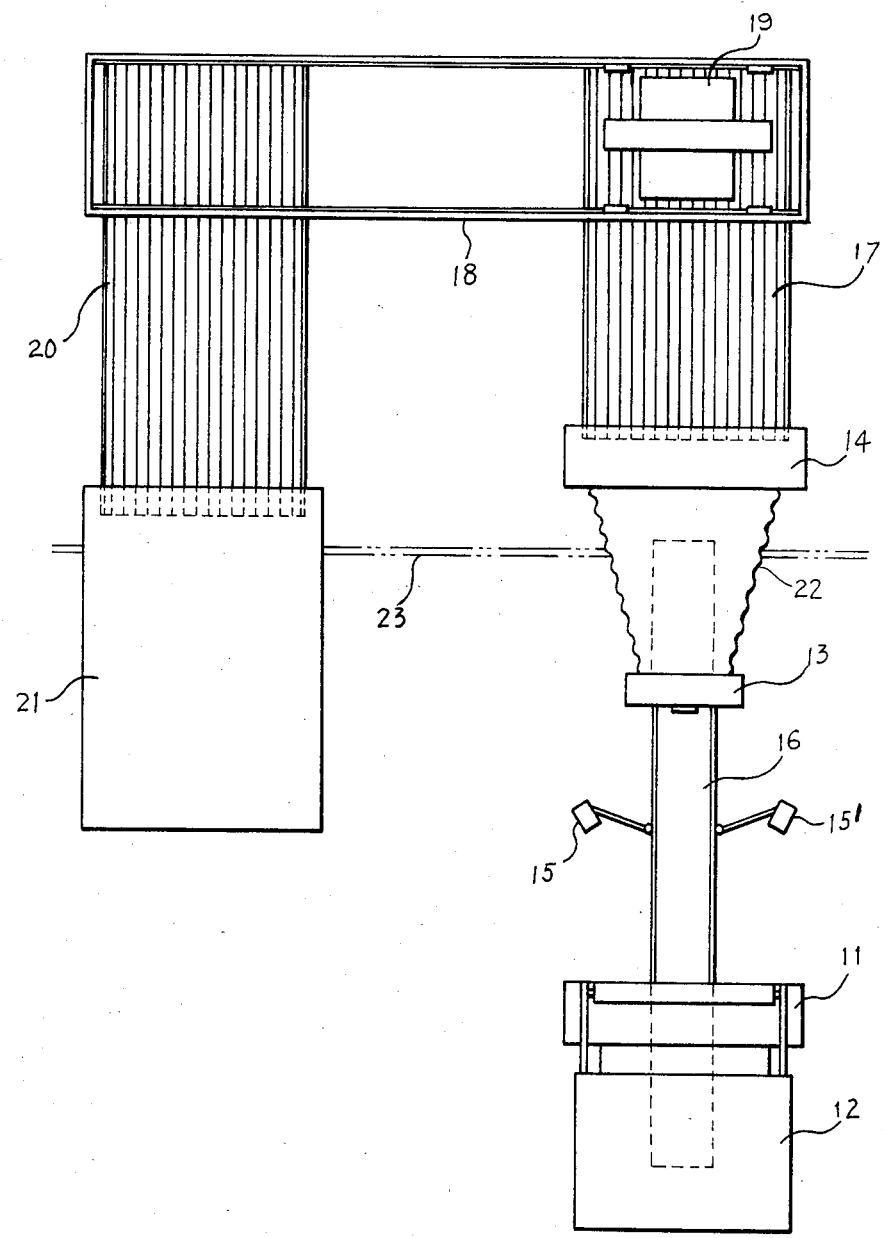
FIG. 1 is a plane view of a process camera according to the invention.

Referring to FIG. 1, there is shown an external plane appearance of the process camera, which comprises a copy feed part including a copy holder 11 and a copy feeder 12, an exposure part including a front case 13 and a rear case 14. A conveyance part including endless belts 17 and 20, a transverse frame 18 and a processor 21. The copy holder 11, the copy feeder 12 and the front case 13 are mounted on a frame 16, which are respectively capable of moving on it. Lamps 15 and 15' are attached to the frame 16 to lighten the surface of the copy holder 11. Bellows 22 is mounted between the front case 13 and the rear case 14 to convert the length between the two. A transverse frame 18 bridges the endless belts 17 and 20, and a carrier 19 is provided to move between the two therein, where the carrier 19 may move by means of the roller system (not shown). The exposure part and the conveyance part are efficiently shielded from light by a douser 23. This process camera, according to the invention, automates all of the following operations: (i) film-punch, in which the rollfilm is led from a magazine provided in the rear case 14 onto the image plane, it is then sucked onto a film holder 25 and is perforated by a perforator 28. (The perforation is required in later camera works.) (ii) exposure, (iii) film-cut, in which the exposed rollfilm is conveyed to the cutting position and is cut by a film cutter 31, (iv) conveyance, in which the cut film is led from the rear case 14 to the processor 21, and (v) copy-supply, in which copies to be reproduced are automatically fed and replaced one by one, relating to the foregoing operations.

Figure 2:
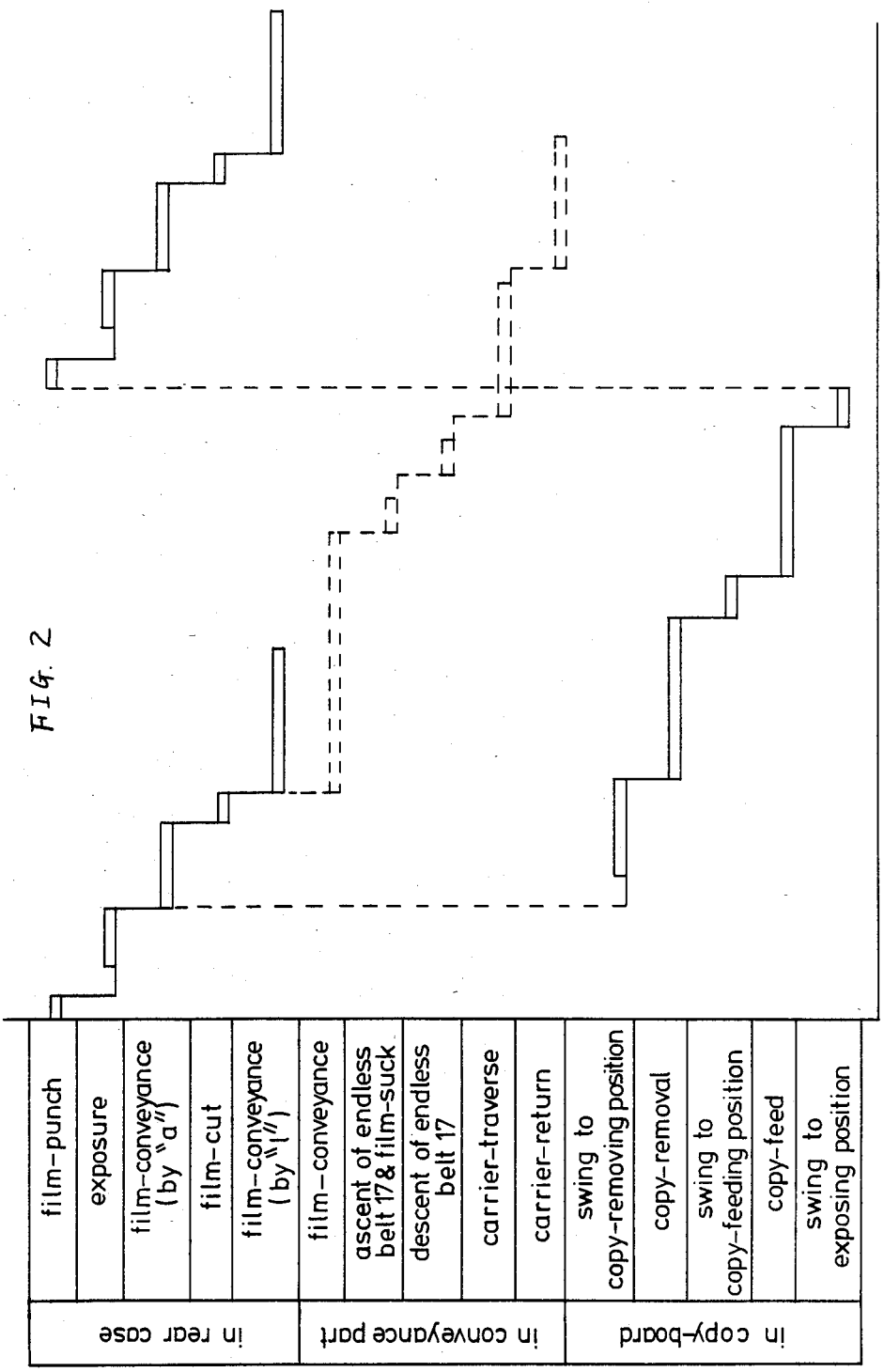
FIG. 2 is a time chart illustrating each operation of the process camera according to the invention.

These operations or procedures are shown in FIG. 2. FIG. 2 shows a time chart of the process camera, from which the sequence or the relation of the each foregoing operations or procedures may be easily understood.

Figure 3:
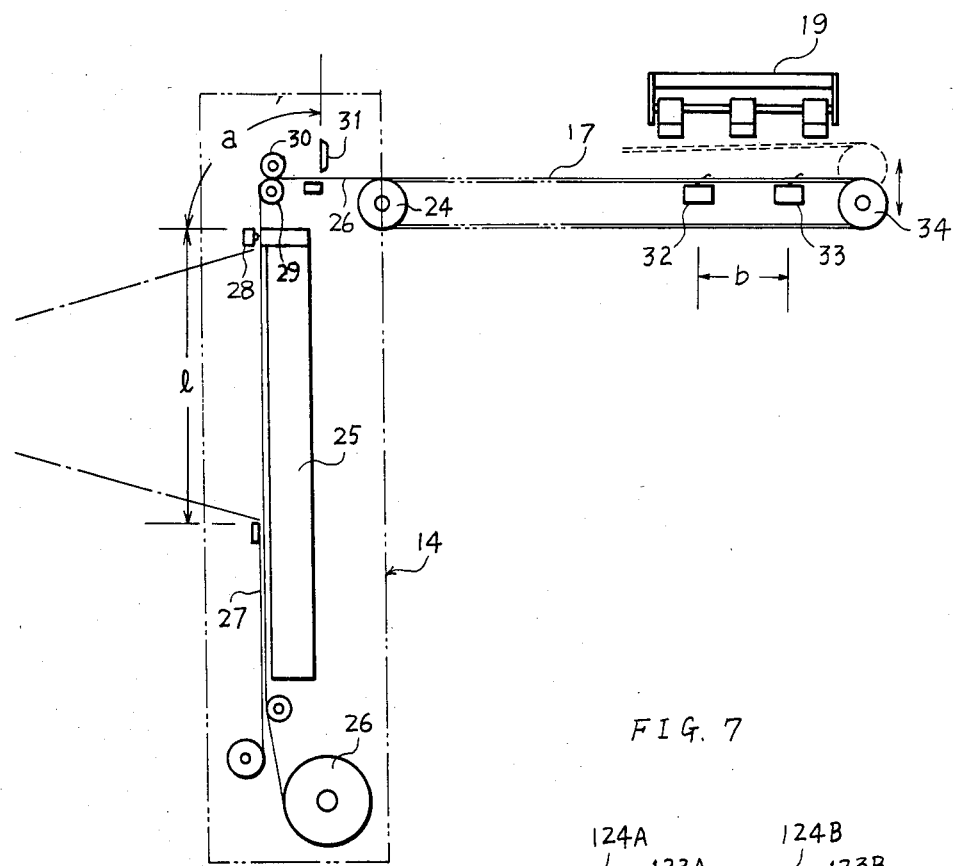
FIG. 3 is a fragmentary sectional side view of the rear case in the process camera.

FIG. 3 shows a side appearance of the rear case 14. Length of a shade 27 can be controlled in accordance with the image frame length. Perforated by the perforator 28, which is mounted in the upper part of the vacuum film holder 25, the rollfilm 26 is exposed in the range of a specific frame for certain period. During perforation and exposure the rollfilm is sucked to the vacuum film holder 25. After exposure the rollfilm is conveyed by the length "a" by means of a driving roller 29 and a weight roller 30. When the lower edge of the last frame in the rollfilm comes to the cutter 31, the rollfilm is stopped and is then cut. Further, after film-cut, the driving roller 29 is rotated again and conveys the rollfilm 26 till the top edge of the new frame comes to the perforator 28. As soon as the new frame comes to the specific position, the frame is prepared for next exposure. The cut film is conveyed in the direction of the carrier 19 by means of the endless belt 17 which is stretched between two belt pulleys 24 and 34. When the cut film touches limit switches 32 and 33, the endless belt 17 is stopped, to raise its rear portion (as shown by imaginary lines), with the cut film being held by the carrier 19.

Figure 4:
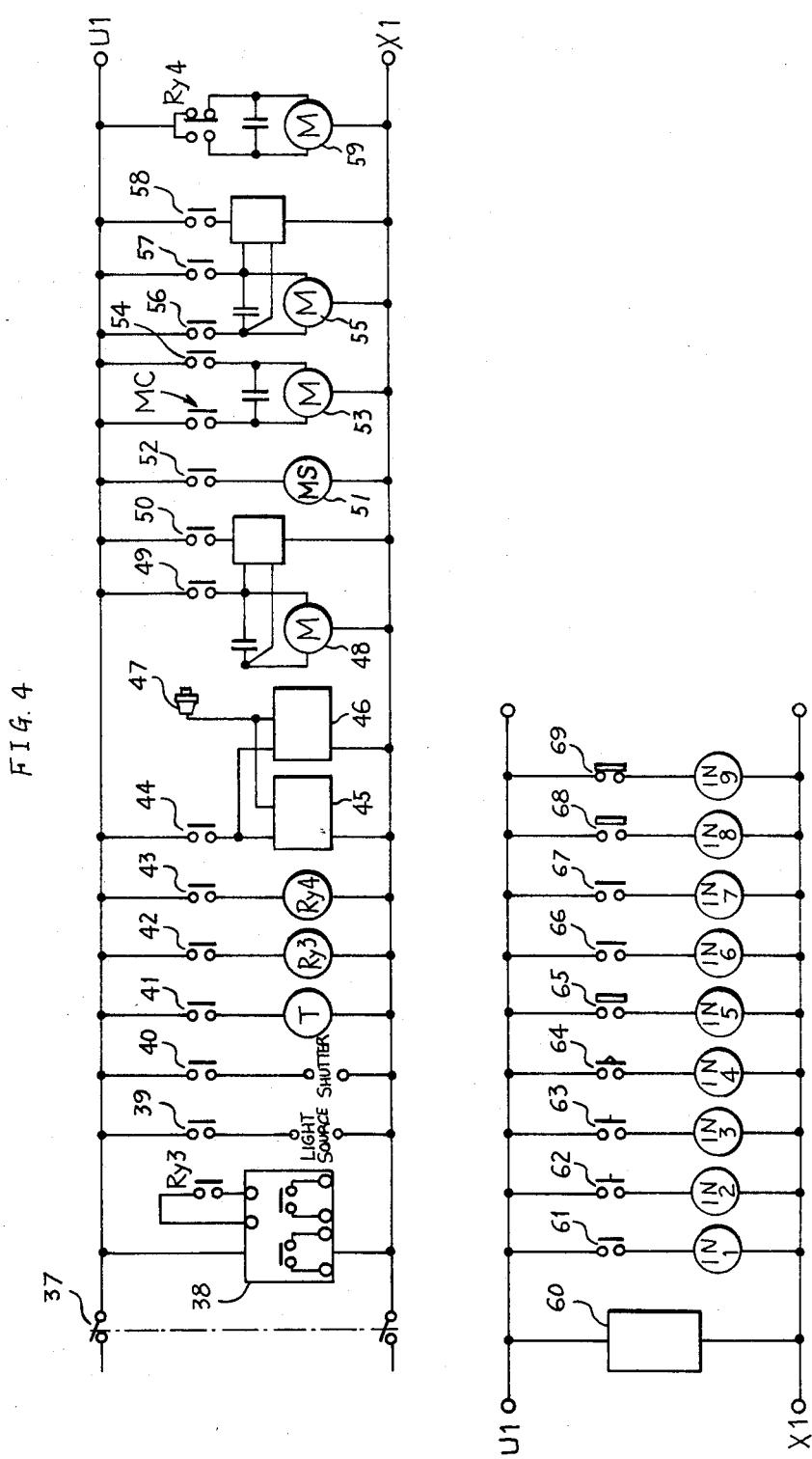
FIG. 4 is a sequential control circuit diagram for explaining sequential operation of each elements of FIG. 3.

These operation series are further explained with reference to FIG. 4 which shows a sequential control circuit diagram. This sequential control circuit is provided for the operations or procedures in the rear case 14, i.e., from the film-punch to the conveyance as shown in FIG. 2. Film-punch is done through the following operations. To begin with, by operating a main switch 37 and switch 62 to work the automatic sequential control circuit, an input signal ($IN_2$) is put into a sequential controller 60. According to a signal from the sequential controller 60, a contact 41 is closed to start sequential controlling periodically, and simultaneously. The contacts of the relay ($Ry_4$) is converted by closing contact 43, whereby motor 59 (which is provided for the perforator 28) is started, to perforate at the specific position of the rollfilm 26. After the film-punch, the exposure is completed through the following operations. Contact 42 is closed, according to a signal from the sequential controller 60, to work a relay ($Ry_3$), whereby an exposure controller 38 functions, closing contact 61. According to a signal from the exposure controller 38, an input signal ($IN_1$) to light lamps 15 and 15' is put into the sequential controller 60. Contacts 39 and 40 are closed to light lamps 15 and 15' for a certain period, according to a signal from the sequential controller 60, a shutter (not shown) is opened. This exposure time is controlled by the exposure controller 38. A signal from the exposure controller 38 makes contact 40 open to operate the shutter. After that conveyance and film-cut is completed through the following operations. A single from the sequential controller 60, makes contacts 44 and 49 to close, which makes motor 48 operate to rotate the driving roller 29, whereby the rollfilm is conveyed by the length "a". This transferring length is converted into pulses, to measure its length by means of a non-contact switch equipped in the driving roller 29 (not shown). As the value of the pulses amounts to the specific value (which is set in a preset counter 45 in accordance with the length "a",) contact 66 is closed to put an input signal ($IN_6$) into the sequential controller 60. Then, on a signal from the sequential controller 60 it makes contact 49 open, and simultaneously makes contact 50 close, to brake and stop motor 48. The film-conveyance of length "a", (which is the length between the perforator 28 and the film cutter 31,) is completed by motor 48. And successively on a signal from the sequential controller 60, it makes either contact 56 or contact 57 close, to drive motor 55, whereby the film cutter 31 is traversed to cut out the rollfilm. After the completion of film-cut, the closed contact 56 or 57 is opened, and simultaneously contact 58 is closed to brake and stop motor 55. Synchronized with the stop of motor 55, either of limit switches 68 or 69, which are mounted against both side-edges of the rollfilm, is operated to put either signal ($IN_8$) or ($IN_9$) into sequential controller 60, which is the signal to instruct completion of film-cut. Further, a signal from the sequential controller 60 makes contact 49 close again, to work motor 48, so the rollfilm is further transferred. The transferring length of the rollfilm is measured by counting the pulses converted to, in the same manner as said above. As the value of pulses amounts to the specific value, (the value is set in the preset counter 46 and is in accordance with the length "l",) a signal from the preset counter 46 makes contact 57 close, whereby an input signal ($IN_7$) is put into the sequential controller 60. So, the transferring length of the rollfilm will agree with the length ("l"—"a").

From the foregoing description, it may be understood that the rollfilm is sucked into the vacuum film holder 25 during film-punch and exposure and is released during conveyance. This exchange of conditions of the vacuum film holder 25, is done through the following operations. According to a signal from the sequential controller 60, contact 52 is closed to operate a magnet switch 51, whereby contact (MC) is closed to work motor 53. Motor 53 is provided for working a valve gear (not shown) to convert the sucking or releasing condition. On converting to the releasing condition, limit switch 65 is closed, to put a conversion signal into the sequential controller 60. Limit switch 65 is interlocked with the valve gear. So, on a signal from the sequential controller 60 it begins the conveyance of the rollfilm. As soon as a completion signal ($IN_7$) is put into the sequential controller 60, (when the signal ($IN_7$) has instructed the conveyance of specific length,) a signal from the sequential controller 60 makes contact 54 close, to revert the film holder 25 to the sucking condition. After the period preset in the timer (T), (when a series of operations in the rear case 14, i.e., perforation, exposure, film-cut and conveyance is completed,) contact 64 is closed, to put the completion signal ($IN_4$) into the sequential controller 60, then the signal ($IN_4$) instructs that a series of operations in the rear case 14 is completed. As a minor side issue, switch 63 is provided for promptly stopping the above mentioned operations as occasion demands.

Figure 5:
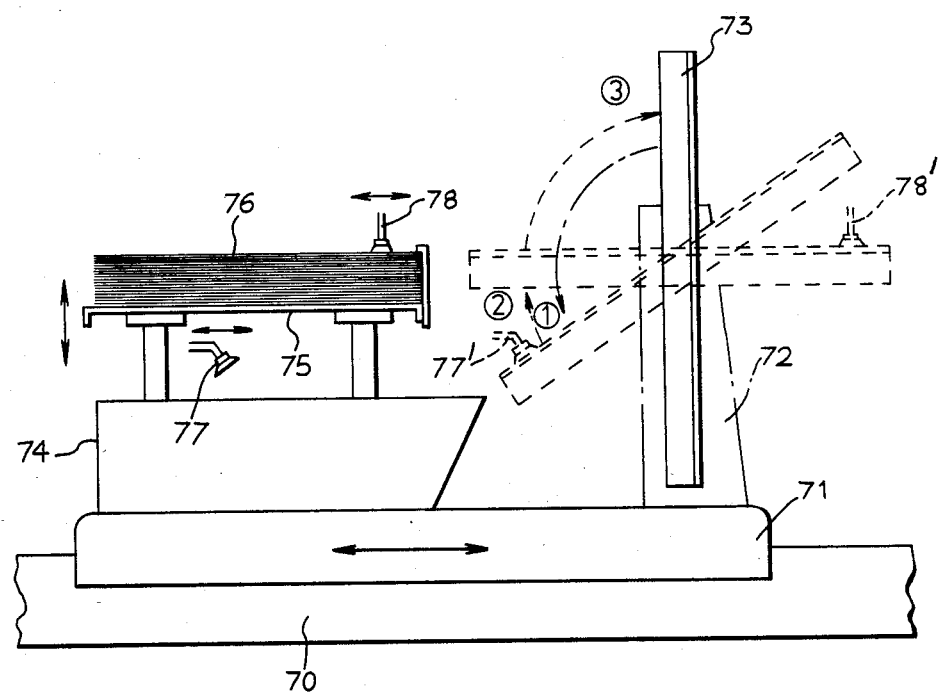
FIG. 5 is a side view of the copy holder in the process camera.

In parallel with a series of operations in the rear case 14, copies to be reproduced are fed onto and removed from copy holder 11 as mentioned below. FIG. 5 is a schematic side view of the copy holder, which illustrates the feeding movement of copies to the copy holder 11. A movable base 71 is mounted on the frame 70 to move thereon. Copy board 73 is supported by a pair of props 72 fixed on the movable base 71 to swing in the range as shown in imaginary lines. A lot of pitholes are provided on the surface of copy board 73 to suck a copy thereon by making vacuous through them. Receiving box 74, to stow used copies, is also mounted on the movable base 71. Also mounted on it is copy rack 75, which is capable of ascent and descent in order to control the copy-level placed on the top at the specific height. Suction feeders 77 and 78 move respectively (as shown by imaginary lines) to either remove a used copy from or feed a new copy onto copy board 73.

Figure 7:
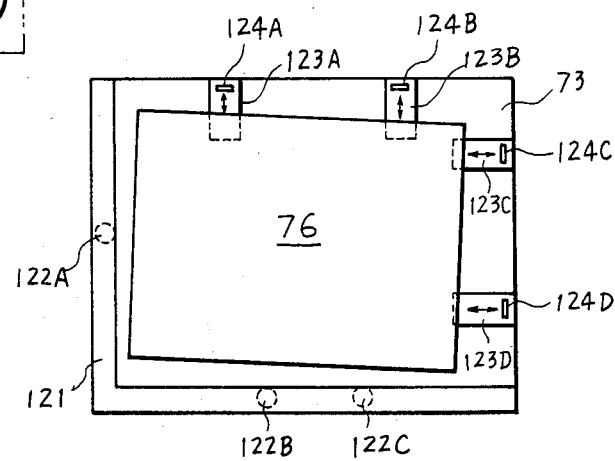
FIG. 7 is a sectional plane view of FIG. 5, illustrating the copy position in the copy holder.

The automatic feeding of copies is as follows. After exposure, (as shown in the time chart in FIG. 2,) a lock (not shown) which keeps the copy board 73 vertical to the optical axis is released to swing it to the copy removing position (as shown by an arrow 1). So, copy board 73 remains vertical. After that, it is investigated by a detector (which is explained later) to discover whether any copy exists on the copy board 73. In the case of the existence of a copy, suction feeder 77 is shifted to the imaginary line 77' to suck up and hold a copy 76. The suction feeder is turned again from position 77' to position 77, with a copy being held. Then, the copy held by the suction feeder 77 is put into the receiving box 74 by releasing the suction. After that, copy board 73 is swung to the copy-feed position, i.e., the horizontal (as shown by an arrow 2). In this position the suction feeder 78 sucks up and holds a copy placed at the top to shift to the imaginary line 78'. The copy held by it is fed onto copy board 73 by releasing the suction. FIG. 7 is a plane appearance of copy board 73. A stopper 121 is mounted to positon copy 76 at the two edges of copy board 73. Detectors 122A, 122B and 122 C are also mounted at the same edges in order to detect the existence of a copy. Grooves 123A, 123B, 123 C and 123D are respectively provided at the edges, opposite to the stopper 121. Catches 124A, 124B, catches are jutting beyond the surface of copy board 73 and can respectively move in the directions of opposite edges to adjust the copy placed on it. When fed onto copy board 73, the copy 76 is adjusted by the catches 124A, 124B, 124C and 124D which slide respectively in the directions of opposite edges. In this manner, a copy is positioned on copy board 73.

After that, copy board 73 is swung to the exposure position, i.e., the vertical position to the optical axis, with a copy being sucked and held by it (as shown by an arrow 3). A series of copy-feeding operations are repeated in the same manner as mentioned above.

Figure 6:
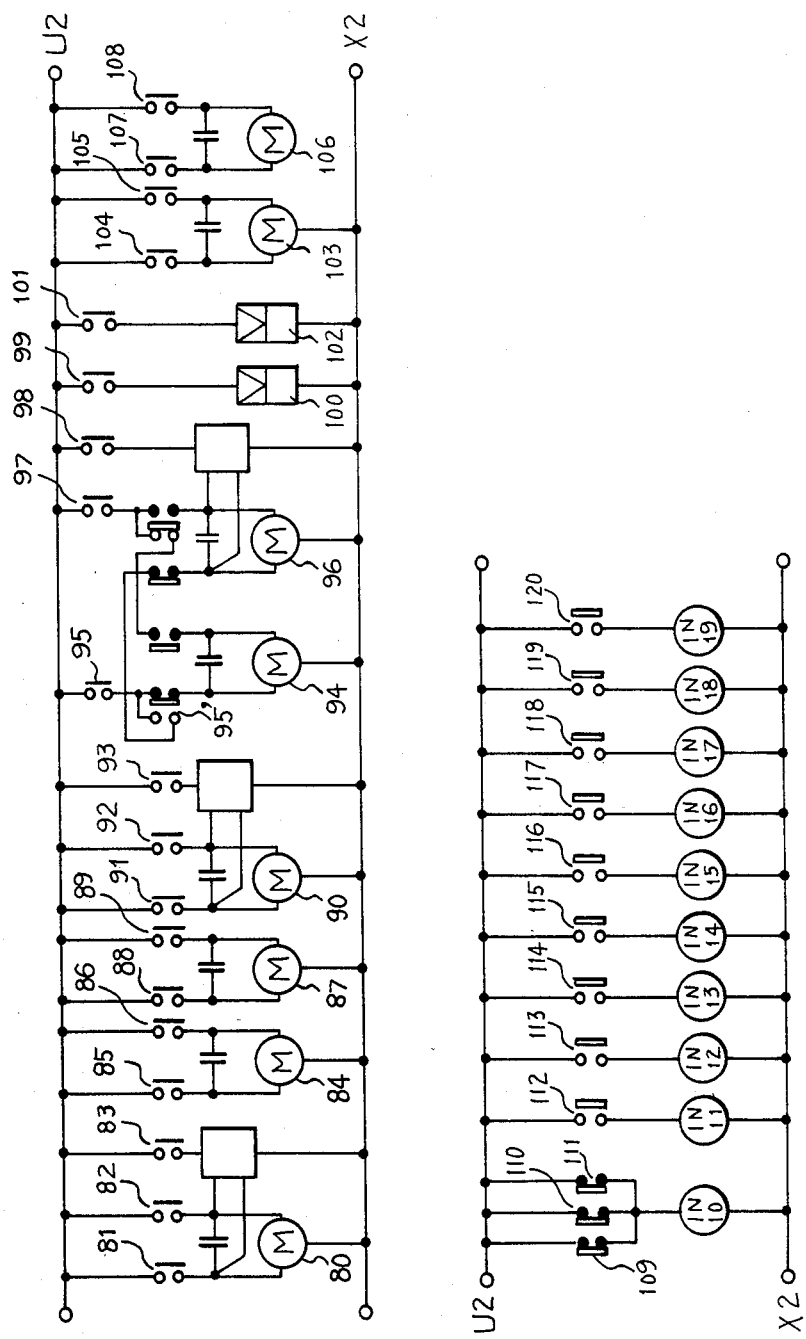
FIG. 6 is a sequential control circuit diagram, explaining sequential operations of each element in FIG. 5.

These automatic copy-feeding operations are further explained referring to FIG. 6, which shows a sequential control circuit diagram. This sequential controlling circuit is provided for the copy-feeding operations. The sequence and relation between a series of these operations and the other one is easily understood from FIG. 2.

By sending an exposure-completion-signal from the exposure controller 38 into the sequential controller 60, a signal from the sequential controller 60 makes contact 86 close, to work motor 84, whereby a lock (not shown) is released which keeps copy board 73 vertical to the optical axis. Synchronized by release of the lock, a limit switch 113 is operated, to put an input signal $(IN_{12})$ into the sequential controller 60, and the signal $(IN_{12})$ instructs the release of the lock. Then, on a signal from the sequential controller 60, contact 81 is closed, and motor 80 operates to swing copy board 73 to the copy removing position, as shown by an arrow 1 in FIG. 5. The arrival of copy board 73 at the removing position makes limit switch 114 function to send signal $(IN_{13})$ into sequential controller 60, whereby contact 81 is opened, and simultaneously contact 83 is closed, to stop motor 80. Then, possible existence of a copy on copy board 73 is investigated by contacts 109, 110 and 111, which are respectively in accordance with detectors 122A, 122B and 122 C shown in FIG. 7. The existance of a copy sends a signal $(IN_{10})$ into the sequential controller 60. On a signal from the sequential controller 60, contact 91 closed to work motor 90, whereby suction feeder 77 begins to move in the direction of copy board 73. The arrival of suction feeder 77 at position 77', as shown by imaginary lines, makes contact 117, which is provided in the limit switch, to send a signal $(IN_{16})$ into the sequential controller 60. Then, on a signal from the sequential controller 60, contact 91 closes, and simultaneously makes contact 93 close, to stop motor 90, whereby suction feeder 77' is kept at the position as shown by imaginary lines. After that, on a signal from the sequential controller 60, contact 99 is closed, to open suck-valve 100 which is provided in suction feeder 77, and simultaneously contact 88 is closed to work motor 87, whereby copy board 73 is then in the non-sucking condition, and reversely suction feeder 77' is then in the sucking condition. Accordingly, the copy on copy board 73 is sucked and held by suction feeder 77'. Then, on a signal from the sequential controller 60, contact 92 closes, to work the motor counterwise, whereby suction feeder 77' returns to position 77. Further, on a signal from the sequential controller 60, contact 99 opens, to remove the copy held by suction feeder 77 into receiving box 74. The arrival of the suction feeder in the position 77 makes contact 118 close, (contact 118 is provised in the limit switch,) to send a signal $(IN_{17})$ into the sequential controller 60. Then, on a signal from the sequential controller 60, contact 82 closes to operate motor 80 counterwise, whereby copy board 73 is swung to the horizontal position, which is shown by an arrow 2. The arrival of copy board 73 makes contact 116 close, which is provided in the limit switch, and it sends a signal $(IN_{15})$ into the sequential controller 60. Then, according to a signal from the sequential controller 60, contact 82 is opened, and simultaneously contact 83 is closed, to brake motor 80, whereby copy board 73 is stopped in the horizontal position. After that, on a signal from the sequential controller 60, contact 101 closes to open suck-valve 102, which is provided for suction feeder 78, so that suction feeder 78 is moved to the sucking condition. So that a copy on copy rack 75 is sucked up and held by suction feeder 78. After that, on a signal from the sequential controller 60, contact 95 closes to operate motor 94, whereby copy feeder 78 is raised a little, with a copy being held. The rise of copy feeder 78 makes contact close, which is provided in a limit switch, and thus operates motor 96, whereby copy feeder 78 is moved to position 78' shown by imaginary lines. The arrival of the copy feeder at position 78' makes contact 119 function to send a signal $(IN_{18})$ into the sequential controller 60. Then, on a signal from the sequential controller 60, contact 95 is opened, and simultaneously contact 98 is closed to brake and stop motor 96. And further, contact 101 is opened to set a copy onto copy board 73. Then, on a signal from the sequential controller 60, contacts 104 and 107 are respectively closed to operate motors 103 and 106, which are respectively provided for catches 124A, 124B, 124C and 124D, whereby the copy set onto copy board 73 is adjusted to the specific position. On a signal from the sequential controller 60, contacts 104 and 107 open after adjustment of the copy, and simultaneously makes contacts 105 and 108 close, so that catches 124A, 124B, 124C and 124D return to original positions.

A signal from the sequential controller 60 makes contact 104 close, and simultaneously makes contact 97 close to operate motor 96, whereby suction feeder 78' is returned to position 78. The arrival at position 78 makes contact 120 (provided in the limit switch) close, to send a signal $(IN_{19})$ into the sequential controller 60. After confirmation that a copy is positioned at the specific location, by a signal $(IN_{10})$ from detectors 122A, 122B and 122C, a signal from the sequential controller 60 makes contact 89 close, to operate motor 87, so that the copy is sucked and held at the specific location by converting copy board 73 into the sucking condition. After that, on a signal from the sequential controller 60, contact 82 is closed again, to operate motor 80, whereby copy board 73 is swung to the exposure position, i.e., the position vertical to the optical axis. The arrival at the exposure position makes contact 115 in the limit switch operates, to send a signal ($IN_{14}$) into the sequential controller 60. Then, on a signal from the sequential controller 60, contact 82 opens, and simultaneously makes contact 83 close reversely to brake motor 80, whereby copy board 73 is kept at the exposure position. After that, a signal from the sequential controller 60 makes contact 85 close, to work motor 84, whereby the lock is operated to fix copy board 73 at the exposure position. Accompanying to the function of the lock, contact 112 which is provided in the limit switch is operated, to put a signal ($IN_{11}$) into the sequential controller 60. Then, the input of signal ($IN_{11}$), according to a signal from the sequential controller 60, makes rollfilm 26 expose in the range of the image frame. Namely, by referring to FIG. 2, the sequential controller 60 sends out an exposure signal, after having a signal that copy board 73 is at the exposure position. After exposure, as above mentioned, the sequential controller 60 sends out a signal to swing copy board 73 to the copy-removing position.

In parallel with the foregoing film-feed, exposure control and copy-feed, the cut-and-exposed film is conveyed into the automatic processor 21 through endless belts 17 and 20 and transverse frame 18. Going into detail, the exposed film is fed onto an end portion of endless belt 17, to be conveyed to the other end opposite to carrier 19. Then, the film is conveyed to an end of endless belt 20 by means of carrier 19. Further, the film is conveyed into the automatic processor 21 by means of endless belt 20. Of course, the conveyance of the exposed film into the processor 21 may be done by any other means. In the case of the processor not being coupled, it may be modified, i.e., the exposed is removed into a magazine which is provided at the film-exit of rear case 14, and film may be fed into the processor, one by one, by hand.

Of course, in this embodiment, an auto-focusing mechanism or an automatic magnifying mechanism (not shown) are equipped, accordingly, previous to the foregoing automatic controlling operations the requisite operations such as focusing, magnication-set or exposure size select may be executed. These operations may be, of course, included in the sequential controlling.

From the foregoing it may be understood that a heap of copies are successively and automatically fed onto the copy board one by one, and that the operations of film-feed, exposure or conveyance are automatically done only by pushing a start button. Consequently, an operator may be released from the complicated operations, so that the efficiency of labor can be sharply increased, and that the efficiency of operation of a process camera itself can be also increased by a large margin.

While the foregoing describes the preferred embodiment of the present invention and the many variations noted above may be adopted, reference is made to the claims appended hereto.

What is claimed is:

1. An automatic process camera including an original feeder for feeding and removing successive originals to be reproduced to and from an original holder, a film feeder for feeding and removing successive frames of sensitized material to and from a film holder, exposure means for exposing a frame of sensitized material on said film holder to a projected image of an original on said original holder for a predetermined time, said original holder comprising an original board with an original receiving surface, and means for pivotally mounting said original board, means for positioning said original board in an exposure position wherein said original receiving surface is vertical and at right angles to the optical axis of the camera, in a loading position wherein said original receiving surface is horizontal, and in a removing position wherein said original receiving surface is inclined to the horizontal, means for synchronizing the operation of said original holder, said film holder, and said exposure means in appropriate coordination to produce a succession of exposures on successive frames of sensitized material of successive originals fed to said holder, said original feeder comprising an original rack for holding a stack of originals to be reproduced, means for moving one original at a time to the original board when the original board is in its horizontal position, means for receiving originals after exposure, and means aligned with a portion of the original and engageable with the original only when the original is on the board in the inclined removing position for removing the original to the means for receiving.

2. An automatic process camera according to claim 1, wherein said means for moving one original at a time comprises a suction feeder mechanism for transferring a top original of said stack to said original receiving surface of said original board when in said loading position, and said means aligned with a portion of the original comprises suction means movable into engagement with the original for removing an original from said original receiving surface of said original board when in said removing position.

3. An automatic process camera according to claim 1, wherein the means for removing the original comprises suction means substantially horizontally movable into engagement with a downwardly tipped edge of the original when the original board is in its inclined position.

4. An automatic process camera according to claim 3, wherein the means for removing is positioned for movement horizontally between the rack and the receiving means to engage the downwardly tipped original and drawl the original back over the receiving means for deposit therein.

* * * * *